United States Patent

[11] 3,624,526

| [72] | Inventor | Irving Silverman<br>Camp Springs, Md. |
|---|---|---|
| [21] | Appl. No. | 34,281 |
| [22] | Filed | May 4, 1970 |
| [45] | Patented | Nov. 30, 1971 |
| [73] | Assignee | The United States of America as represented by the Secretary of the Navy |

[54] WIDE BAND DIGITAL QUADRATURE CIRCUIT
2 Claims, 6 Drawing Figs.

[52] U.S. Cl................................................. 328/166,
307/225, 307/262, 324/83 Q, 328/17, 328/29,
328/55, 328/60, 328/62, 328/133
[51] Int. Cl...................................................... H03b 1/04
[50] Field of Search.......................................... 328/29, 55,
60, 62, 133, 134, 155, 166, 17, 16, 15; 307/232,
262, 295, 220, 225; 332/23; 324/83 D, 83 Q

[56] References Cited
UNITED STATES PATENTS

| 3,248,663 | 4/1966 | Jacob | 328/133 X |
| 2,858,425 | 10/1958 | Gordon | 328/134 |
| 3,229,230 | 1/1966 | Feldman | 307/295 X |
| 3,517,322 | 6/1970 | Lay | 328/133 |
| 3,538,345 | 11/1970 | Norz | 328/133 X |
| 3,541,351 | 11/1970 | Mansson | 307/262 X |

*Primary Examiner*—Stanley T. Krawczewicz
*Attorneys*—R. S. Sciascia, Arthur L. Branning and James G. Murray

ABSTRACT: A circuit for producing digital quadrature signals over a very large frequency range wherein an input signal of frequency $2f$ is processed to provide two phase-opposed signals which are in turn processed by flip-flops to thereby provide digital quadrature signals of frequency $f$.

PATENTED NOV 30 1971 3,624,526

FIG. 2A — INPUT TO 10  $2f\underline{/\phi}$

FIG. 2B — INPUT TO 12  $2f\underline{/\phi}$

FIG. 2C — INPUT TO 14  $2f\underline{/\phi + 180°}$

FIG. 2D — OUTPUT FROM 12  $f\underline{/\frac{\phi}{2}}$

FIG. 2E — OUTPUT FROM 14  $f\underline{/\frac{\phi}{2} + \frac{180°}{2}}$

INVENTOR
*IRVING SILVERMAN*

BY *James G Murray*
*Richard L ...*
ATTORNEYS

3,624,526

WIDE BAND DIGITAL QUADRATURE CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It will be obvious to the reader that the invention later disclosed and described herein has a wide utility and can, in general, be advantageously used wherever there is a need to produce quadrature signals, particularly if such quadrature signals vary widely in frequency.

However, it is considered that the reader may be interested in the specific programs and problems which led to this invention, since such knowledge, while describing only one "far-out" use of the invention, may give an insight into, and trigger the imagination of the reader concerning the many other uses to which the invention can be put.

Various electronic systems for use with earth orbiting satellites have been developed which require the rapid phase measurement of a sequenced series of signals of greatly different frequency. In processing these signals of greatly different frequency, and in particular for the phase-measuring aspects of such processing, it is required to produce precisely accurate digital (square wave), quadrature signals at these greatly different frequencies.

Because of the frequency sensitivity of most commonly used quadrature circuits, prior to this invention separate quadrature signal-producing circuits were used for each frequency. This circumstance represented a rather obvious chance to reduce weight, cost and space requirements if a single quadrature circuit could be designed which would satisfactorily function over a wide frequency range.

SUMMARY OF THE INVENTION

In addition to allowing an improvement in the design of the above-described electronic systems by providing a circuit for producing quadrature signals over a wide frequency range, this invention has the general purpose of furnishing a digital quadrature signal-producing circuit which embraces all of the advantages of prior quadrature signal-producing circuits while being virtually free of the frequency sensitivity disadvantageously present in these prior circuit.

To attain the desired frequency insensitivity, the invention avoids the lumped inductance and capacitance components of prior circuits and utilizes a device, such as a frequency insensitive paraphase amplifier or negative- and positive-going zero detectors to provide two phase-opposed signals which are applied to flip-flops, the outputs of which are the desired quadrature signals.

OBJECTS OF THE INVENTION

An object of the invention is, therefore, to provide an improved circuit for producing quadrature signals.

Another object is to provide an improved circuit for producing quadrature signals which is frequency insensitive.

Still another object is to provide an improved circuit for producing quadrature signals which is frequency insensitive and which processes an input signal of frequency $2f$ to produce two 180 phase-opposed signals, also at a frequency of $2f$, which are in turn processed by flip-flop circuits to produce quadrature signals of a digital nature at a frequency $f$.

DESCRIPTION OF THE DRAWINGS

The exact nature of this invention as well as other objects and advantages thereof will be readily apparent from consideration of the following specification relating to the annexed drawing in which:

FIGS. 2A–2E contain waveforms which are useful in understanding the invention.

DESCRIPTION OF THE INVENTION

Figure 1:
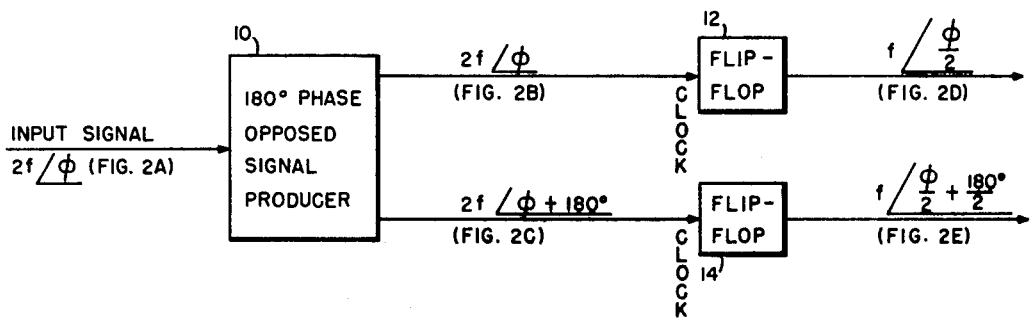
FIG. 1 illustrates the invention in block diagram form.
Figure 1:
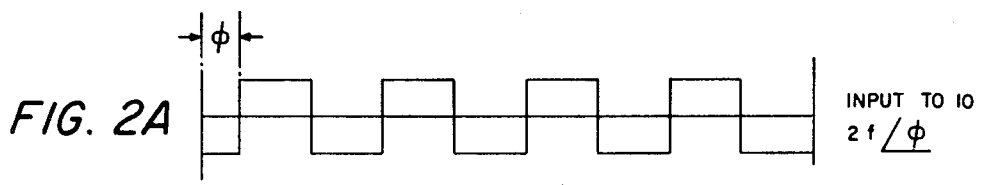
Figure 1:
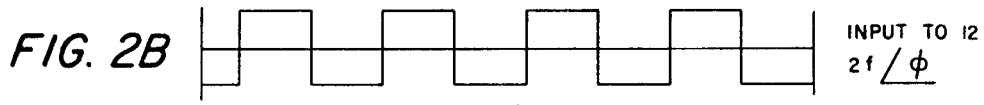
Figure 1:
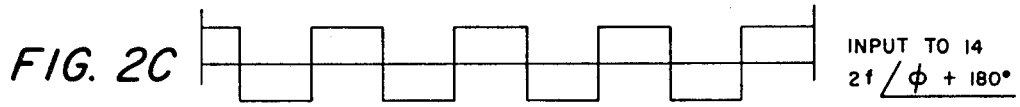
Figure 1:
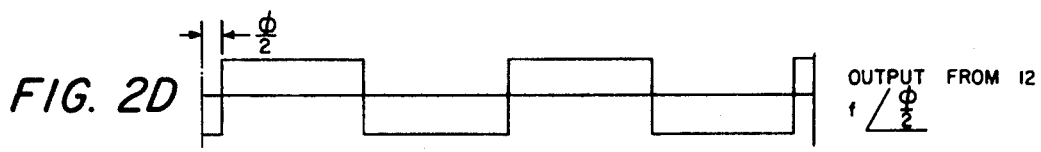
Figure 1:
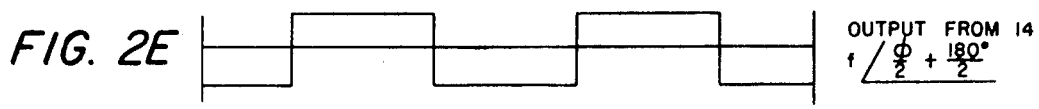

The reader is now referred to the illustration of the invention in FIG. 1 which, together with the waveforms shown in FIG. 2, supplement the following description of the invention.

As shown in FIG. 1, the input signal to the invention is not limited to a particular waveform or frequency and has been shown in FIG. 2A as a digital (square) wave of frequency $2f$ merely for convenience of drafting and description. Depending on the nature of the input signal, the 180° phase-opposed signal producer 10 (which is connected to receive the input signal) may take many forms, subject only to the requirement that component 10 produce two 180° phase-opposed signals of frequency $2f$ and be frequency insensitive. For example, if the input signal is sinusoidal the component may include a paraphase amplifier which may be a Motorola 2N3292 transistor as found in Motorola Semiconductor Data Book dated Aug. 1966, where the 180° phase-opposed signals are taken from the collector and emitter leads. If the input signal is a square wave, the component 10 need be no more than a simple NAND gate which may be a Texas Instrument SN 7400 as found in the Texas Instrument Integrated Circuits Catalog of Aug. 1969.

Similarly, the 180° phase-opposed output signals of component 10 can be of a variety of shapes, i.e., sinusoidal, square, pulsed, etc. Again for convenience of drafting and description, the outputs of signal producer 10 are shown in FIGS. 2B and 2C as being 180° phase-opposed square waves.

The output signals from signal producer 10 are connected to flip-flops 12 and 14 which preferably are of the miniaturized, commercially available flip-flop circuits which may be Texas Instrument SN 7473 as found in the Texas Instrument Integrated Circuit Catalog of Aug. 1969, wherein the input signals are received at the "clock" input terminal and which are virtually frequency insensitive for the frequency range from DC to 20 mc. As is well known, the flip-flop circuit acts as a binary divider, i.e., divides both the frequency and phase of the input signal by two. The outputs of flip-flops 12 and 14 are therefore at the desired frequency $f$ and at the desired quadrature (90°) phase relationship, as shown in FIGS. 2D and 2E.

By now the operation of the invention is, no doubt, understood, The input signal to component 10 can be generalized as being $2f/\Phi$, where $\Phi$ is any angle dependent upon the time reference and has been shown as 90° in FIG. 2A. This $2f/\Phi$ input signal energizes the signal producer 10 to apply two 180° phase-separated signals, which can be generalized as $2f/\Phi$ and $2f/\Phi+180°$, to the flip-flops 12 and 14. The output of flip-flops 12 and 14, because of their well-known binary divider properties, are square waves which are at the desired frequency $f$ and are in quadrature, i.e., 90° phase separated.

Because the disclosed invention avoids the use of lumped impedances to obtain phase shift, the invention is frequency limited only by the limitations of the components 10, 12 and 14. Circuits suitable for use as these components are commercially available and are frequency insensitive in the frequency range from 0 to 20 mc.

There has been disclosed a circuit for producing digital quadrature signals. Obviously many modifications and variations of the present invention are possible in the light of the above teachings. For example, it is apparent that by raising the input frequency and adding additional stages of flip-flop dividers, phase differences of 45°, 22.5°, etc. can be developed with great accuracy. It is therefore to be understood that, within the scope of the appended claims, the invention may be practiced otherwise than as specifically described.

What is claimed and desired to be secured by Letters Patent of the United States is:

1. A circuit for producing digital quadrature signals of frequency $f$ where $f$ can vary over a very large frequency range comprising:

signal producer means for being energized by an input signal of $2f$ to produce first and second signals, both having a frequency of $2f$ and said first signal being 180° phase opposed to said second signal and first and second flip-flop circuits connected to receive said first and second signals whereby the output signals of said first and second flip-flop circuits are digital quadrature signals at the desired frequency $f$.

2. A circuit for producing signals with a constant angle of phase difference and each being at a frequency $f$ where $f$ can vary over a very large frequency range comprising:

signal producer means for being energized by an input signal of $2^n f$ where $n$ is a positive integer, to produce first and second signals, both having a frequency of $2^n f$ and said first signal being 180° phase-opposed to said second signal and first and second divider circuit means connected to receive said first and second signals, each of said divider circuit means containing $n$ stages of series-connected flip-flop circuits, whereby the output signals of said first and second divider circuit means are at the desired frequency $f$ and are at a constant phase angle relative to each other even though said frequency $f$ varies through a very large frequency range.

* * * * *